US009303982B1

(12) United States Patent
Ivanchenko et al.

(10) Patent No.: US 9,303,982 B1
(45) Date of Patent: Apr. 5, 2016

(54) DETERMINING OBJECT DEPTH INFORMATION USING IMAGE DATA

(71) Applicant: Amazon Technologies, Inc., Reno, NV (US)

(72) Inventors: Volodymyr V. Ivanchenko, Mountain View, CA (US); Sharadh Ramaswamy, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 401 days.

(21) Appl. No.: 13/890,125

(22) Filed: May 8, 2013

(51) Int. Cl.
*H04N 11/00* (2006.01)
*G01B 11/22* (2006.01)

(52) U.S. Cl.
CPC ........................................ *G01B 11/22* (2013.01)

(58) Field of Classification Search
CPC .... G01B 11/00–11/005; G01B 11/02–11/022; G01B 11/026–11/028; G01B 11/03–11/046; G01B 11/14; G01B 11/22; H04N 13/0022; H04N 2013/0081; H04N 13/0271; H04N 13/0495; H04N 2213/003; H04N 2213/005; G06T 7/0051–7/0077
See application file for complete search history.

(56) References Cited

U.S. PATENT DOCUMENTS

| 2003/0164875 | A1* | 9/2003 | Myers ............................. 348/52 |
| 2012/0062729 | A1* | 3/2012 | Hart et al. ..................... 348/135 |
| 2014/0063355 | A1* | 3/2014 | Tseng ................................ 349/1 |
| 2014/0219581 | A1* | 8/2014 | Astrand et al. ................. 382/284 |
| 2014/0241614 | A1* | 8/2014 | Lee ................................. 382/154 |
| 2014/0300704 | A1* | 10/2014 | Ramaswamy et al. .......... 348/48 |

* cited by examiner

*Primary Examiner* — Jefferey Harold
*Assistant Examiner* — Humam Satti
(74) *Attorney, Agent, or Firm* — Novak Druce Connolly Bove + Quigg LLP

(57) ABSTRACT

Approaches to enable a computing device, such as a phone or tablet computer, to determine depth information about an object captured by a single camera of the device without requiring multiple cameras to capture that object in their field of view. For example, the computing device may track the object throughout a sequence of images using a single rear-facing camera and then determine the depth information of that object by combining data about the object's changes in size (throughout the sequence of images) and information about the distance between the computing device and a user's face (or other user's feature) that can be determined using two or more front-facing cameras configured for stereo imaging. The depth information of the object may include the distance between the computing device and the object, the distance between the object and the user's face, or the physical dimensions of the object, among other such information.

20 Claims, 11 Drawing Sheets

DETERMINING OBJECT DEPTH INFORMATION USING IMAGE DATA

BACKGROUND

Recent years have seen drastic increases in the use of portable computing devices, such as smart phones and tablet computers. Today's consumers are utilizing such devices for a wide variety of different purposes, such as to access and search the Internet, purchase products and services, capture and/or send digital images, compose electronic mail (email) messages, make telephone calls and the like. One particular area of some attention, sometimes referred to as augmented reality, has been the ability to process image data captured by digital cameras often embedded in such devices in order to perform various actions based on the information in the image. For example, if the image contains an object that can be recognized as a product, the computing device may invoke an application to allow the user to purchase the product from an electronic commerce (e-commerce) provider. Similarly, if the image contains an object recognized as a place of business (e.g., restaurant, bar, etc.), the computing device may display visual elements to allow the user to invoke a map application to display directions to the place of business. Many other examples of such augmented reality image processing are possible and exist today.

In this context of augmented reality processing, it may be desirable for the computing device (e.g., mobile phone, tablet, etc.) to determine depth information associated with the object being captured by the camera of the computing device. For example, it may be useful for the device to know how far away the object is located from the computing device or from the user. However, because augmented reality image processing is conventionally performed using a single rear-facing digital camera, object depth information has not been readily available under most conditions.

BRIEF DESCRIPTION OF THE DRAWINGS

Various embodiments in accordance with the present disclosure will be described with reference to the drawings, in which.

DETAILED DESCRIPTION

Figure 1:
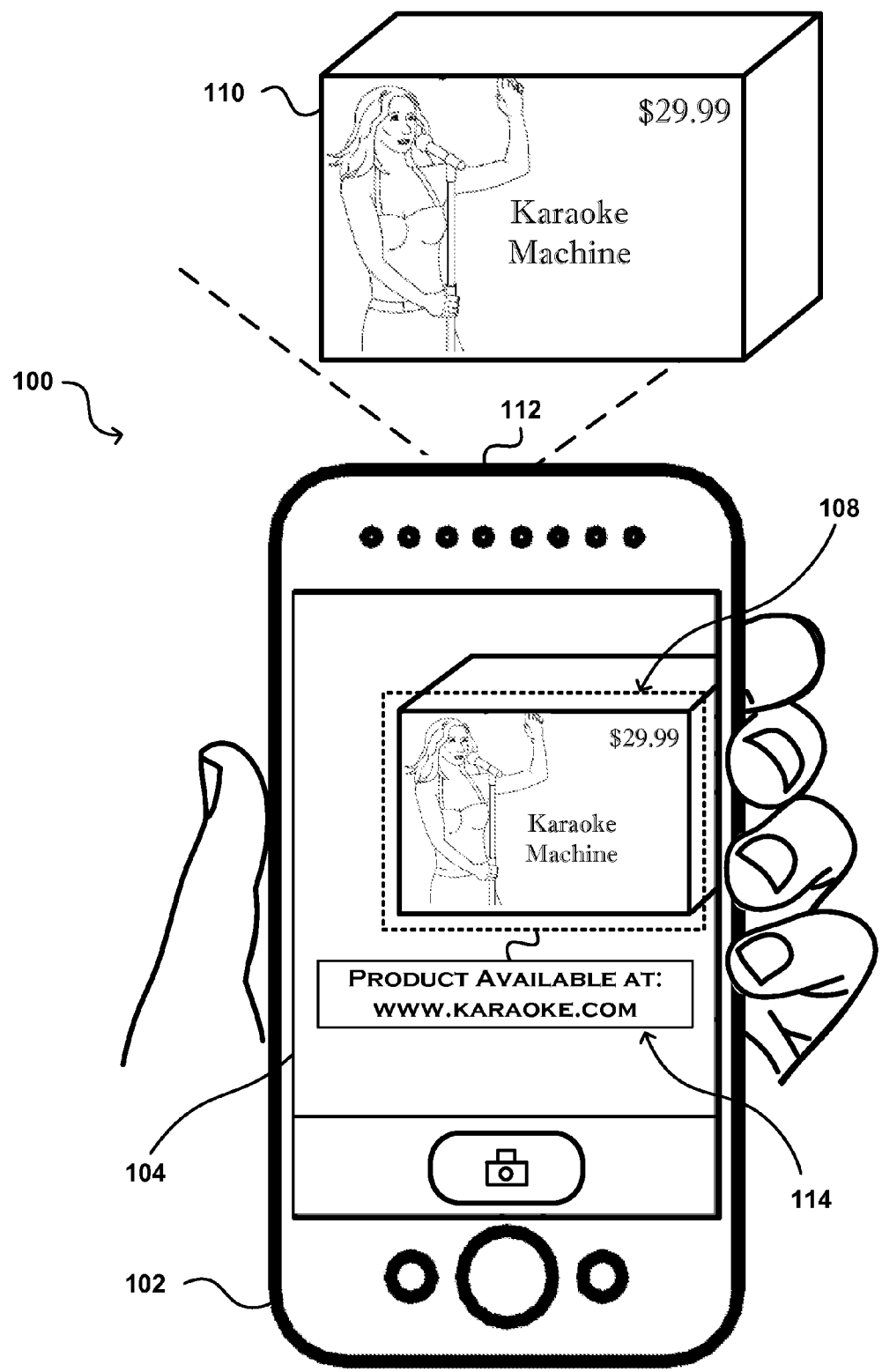
FIG. 1 illustrates an example of a computing device being used in the context of augmented reality image processing, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for processing image data captured using one or more cameras. In particular, various approaches discussed herein enable a computing device, such as a phone or tablet computer, to determine depth information about an object captured by a single camera of the device without requiring multiple cameras to capture that object in their field of view. For example, the computing device may track the object throughout a sequence of images using a single rear-facing camera and then determine the depth information of that object by combining data about the object's changes in size (throughout the sequence of images) and information about the distance between the computing device and a user's face (or other user's feature) that can be determined using two or more front-facing cameras configured for stereo imaging. The depth information of the object may include the distance between the computing device and the object, the distance between the object and the user's face, or the physical dimensions of the object, among other such information.

In accordance with an embodiment, to determine the depth information, the computing device may capture a first image using the rear-facing camera, where the first image contains an object that can be tracked (e.g., by using one or more feature detectors). At the time of capturing the first image, the computing device may also determine a first distance between the computing device and the user's face (or other feature point that serves as a reference within view of the front-facing cameras). This first distance may be computed based on image data captured by using two or more front-facing cameras configured for stereo imaging. For example, the first distance may be estimated based on the stereo disparity of a feature point on the user's face between a pair of stereo images captured by the front-facing cameras. It should be noted that the distance computations described herein are not limited to using feature points on the user's face and that feature points of any stationary objects that are located at a limited, finite distance from the device and within the field of view of the front-facing cameras of the device can be used as a reference to determine the distance. In some embodiments, the distance may be limited to not more than a number of multiples of the stereo camera base-line (e.g., stereo camera separation distance). Additionally, it should be noted that terms such as "front" and "rear" are used throughout this disclosure for purposes of convenience and simplicity of explanation but in various alternative embodiments, the cameras can be placed in any appropriate location or orientation as will be evident to one of ordinary skill in the art.

After capturing the first image, the computing device may capture a second image using the rear-facing camera, where the second image also contains the object being tracked. The second image may be captured once the camera and/or the computing device have been physically moved after having captured the first image. For example, the second image may be captured once the user has moved their hand holding the computing device closer or further away from the object, thereby changing the distance between the object and the computing device while the distance between the object and the user's face remains substantially the same. At the time of capturing the second image, the computing device may compute a second distance between the computing device and the user's face (or other feature). This second distance may also be computed by using image data gathered by the front-facing cameras at the time of capturing the second image by the rear-facing camera (e.g., based on stereo disparity of a user's feature in a pair of stereo images).

Once the computing device has captured the first and second images, the device may compute a change in the size attributes of the object (i.e., the scale change) between the first image and the second image. For example, the computing device may compute a bounding box around a set of feature points of the object that are being tracked, and then determine a scale change that corresponds to the ratio of the bounding box sides as the bounding box becomes smaller or larger between the first and second image.

In various embodiments, by combining the information about the changes in object size (i.e., scale changes) and the information about the distance between the device and the user's face (or other feature) in one or more equations, the computing device is able to determine depth information associated with the object being tracked. The depth information may include the distance between the object and the computing device (at the time of capturing the first image or the second image), the total distance between the object and the user's face, information about the dimensions of the object, and any other three dimensional information associated with the object being tracked.

In at least some embodiments, the computing device is also able to use the techniques described herein to determine an amount of misalignment between the two or more front-facing stereo cameras that may be caused by physical impacts to the computing device, manufacturing defects or other factors. For example, the computing device may determine an offset caused by the misalignment of at least one of the two front-facing cameras around the yaw axis. This can be performed by using the rear-facing camera to capture at least a third image containing the object, computing the distance between the device and the user's face, computing the scale changes between the three images and then combining all of the information from the three images to compute an offset that is caused by the misalignment of the front-facing camera around the yaw axis. It should be noted that any of the axes (e.g., yaw, pitch or roll) mentioned in this disclosure are provided for purposes of explanation and the various embodiments described herein do not require any specific orientation unless otherwise stated.

FIG. 1 illustrates an example 100 of a computing device being used in the context of augmented reality image processing, in accordance with various embodiments. The client computing device 102 is shown to be a mobile phone, however the computing device may be any device having a processor and a display, including but not limited to tablet computers, electronic readers (e-readers), digital music players, laptops, personal digital assistants (PDAs), personal computers (PCs), wearable computing devices, such as smart watches, augmented reality glasses, virtual reality goggles, or the like. The computing device 102 may include one or more digital cameras configured to capture an image or a sequence of images. In at least some embodiments, the computing device 102 may operate in a live camera view mode (or other augmented reality mode), where the sequence of images being captured by the camera is continuously being displayed on the display screen 104 of the computing device 102. In this live camera view mode, the user of the computing device 102 may activate a shutter element (e.g., button, touch screen element, etc.) to cause the camera to capture (i.e., snap) the image currently being displayed on the display screen 104 and persist that image into non-volatile memory, such as flash memory, solid state drive (SSD) or the like.

While operating in the live camera view mode, the computing device 102 may recognize and/or track objects in the sequence of images being captured by the rear-facing camera 112 and may display various information and graphical elements overlaid on top of the objects in the image currently being displayed. For example, the computing device 102 may track object 110, in this case a box containing a karaoke machine, and may display one or more graphical elements adjacent to the object 110 being tracked, such as a boundary box around the object 110. Additionally, the computing device 102 may display actionable text 114 next to the graphical element, which may be activated by the user to invoke a specified function associated with the object 110. In this particular example, the actionable text 114 allows the user to invoke a web browser application to open a web page that enables the user to purchase the product. The uniform resource locator (URL) of the web page may be determined by the computing device 102 based on recognizing a set of distinctive features of the object 110 and by performing a search (e.g., web search, database search, etc.) for objects that match those features.

In certain cases, while operating in live camera view mode (or other augmented reality mode), it may be useful for the computing device to determine depth information associated with the object 110. In particular, it may be useful for the computing device 102 to determine the distance between the object 110 and the computing device or the exact (or at least approximate) dimensions of the object 110 in order to provide an improved augmented reality experience to the user. For example, if there are several different versions of a product, it may be useful for the computing device 102 to have information about the size of the product in order to determine which version of the product the object 110 being viewed by the camera 112 corresponds to. As another example, if the object corresponds to a piece of furniture, it may be useful for the computing device to be able to determine the specific dimensions (e.g., width, length and height) of the furniture and display those dimensions to the user in order to allow the user to check whether the piece of furniture will fit into their residence. Many other examples of use cases of object depth information are possible within the scope of the embodiments described herein.

As previously described, the computing device 102 may compute the depth information of the object 110 by using a combination of image data gathered by both the rear-facing camera 112 of the device 102 and at least two or more front-facing cameras that have been configured for stereo image processing. Configuring two or more front-facing cameras for stereo image processing is well known and has conventionally been implemented for gesture detection. In at least some embodiments, the use of the front-facing stereo cameras can also enable the computing device 102 to determine (e.g., estimate) the distance between one or more features of a user (e.g., a user's face) and the computing device based on the stereo disparity between the pairs of images being captured by the front-facing cameras. Some examples of configuring multiple front-facing cameras for stereo image processing and using those front-facing stereo cameras to determine distances between the user and the device will be described later in this disclosure, particularly with reference to FIGS. 5-8.

Figure 2:
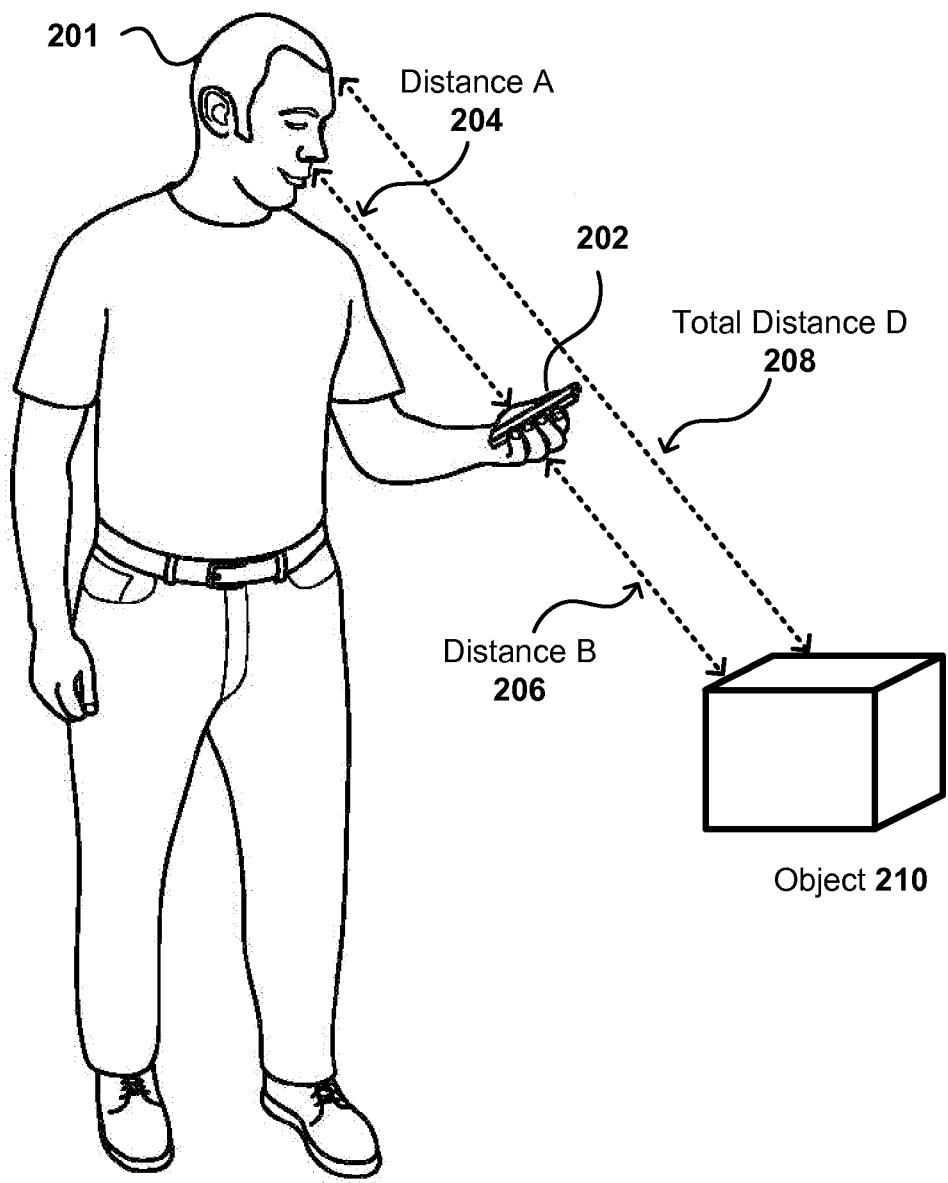
FIG. 2 illustrates an example of a user holding a computing device at a distance between the user's face and the object being tracked by the device, in accordance with various embodiments.

In various embodiments, the computing device may utilize the size variation (e.g., scale changes) of the object being tracked by the rear-facing camera in combination with the distances between the user and the device determined using the front-facing stereo cameras in order to calculate the object's depth information. FIG. 2 illustrates an example 200 of a user holding a computing device at a distance between the user's face and the object 210 being tracked by the device, in accordance with various embodiments. As shown in the illustration, the user 201 is holding a mobile phone 202 in their hand while aiming the mobile phone 202 at an object 210 and while simultaneously viewing the display screen of the mobile phone 202 which may be operating in augmented reality mode and displaying various information associated with the object 210 being tracked.

In the illustrated embodiment, the computing device 202 is being held by the user 201 at a particular distance 206 from the object 210 and at another distance 204 from the user's face (or other features of the user). In addition, the user 201 is freely able to move the computing device closer to the object 210 or further away from the object 210, thereby changing the distances 206 and 204. However, unless the user 201 physically moves their head or the object itself, the total distance 208 between the object and the user's face would remain substantially the same throughout any movements of the user's arm. Therefore when the user is not moving his head, but is simply looking at the object 210 through the camera, and moves the computing device 202 forward and backward using their arm, the distance 208 between the user's head and the object 210 remains the same and the variable that changes is the location of the camera (i.e., computing device) in between.

Figure 3A:
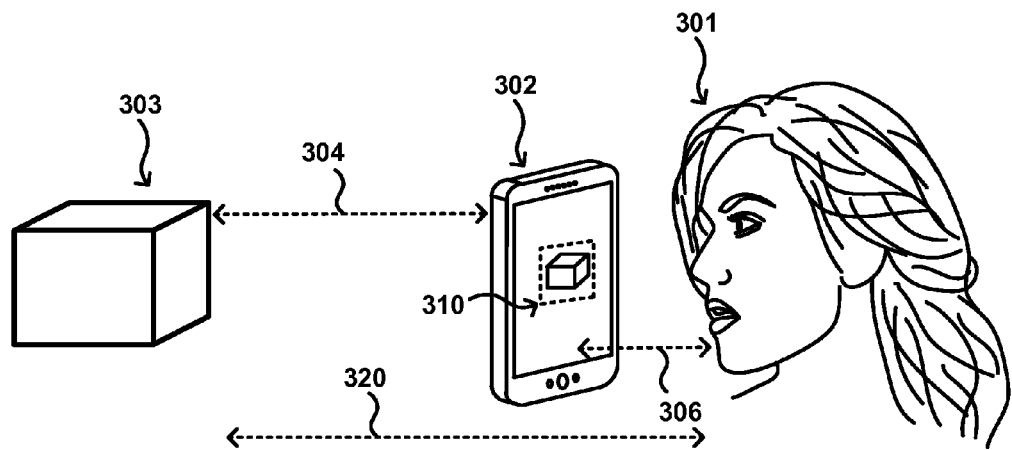
FIG. 3(a) illustrates an example where the computing device has been moved closer to the user's face, in accordance with various embodiments.
Figure 3B:
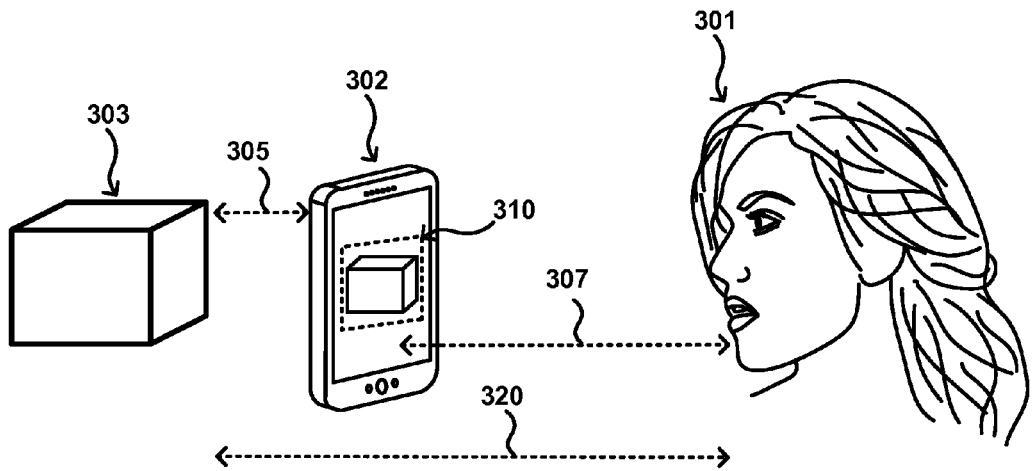
FIG. 3(b) illustrates an example where the computing device has been moved away from the user's face and closer to the object being tracked, in accordance with various embodiments.

FIGS. 3(a) and 3(b) illustrate an example of moving the computing device to change the distance between the object and the computing device. In particular, FIG. 3(a) illustrates an example where the computing device has been moved closer to the user's face (or other stationary object that serves as a reference and is located within view of the front-facing cameras), while FIG. 3(b) illustrates an example where the computing device has been moved farther away from the user's face and closer to the object being tracked. In various embodiments, if the computing device 302 is operating in an augmented reality mode, the device 302 may be continuously (or periodically) capturing images of the object 303. Therefore, the computing device will have captured a first image of the object 303 at a distance 304 away from the camera in FIG. 3(a) and a second image of the object 303 at a distance 305 away from the camera in FIG. 3(b). In both examples of FIG. 3(a) and FIG. 3(b), the total distance 320 between the user's face 301 and the object 303 has remained the same or substantially the same. This constant distance 320 will be referred to as distance "D" in the examples of equations that follow. As further evident from the illustration, the distance between the user's face and the computing device has changed as a result of moving the computing device. Similarly, the distance between the computing device and the object has also changed as a result of physically moving the computing device.

In various embodiments, the computing device 302 may utilize an object tracker to track the object 303 of interest using images from the rear-facing camera (RFC). When the object in a scene moves towards the camera or moves away from the camera, its scale changes (e.g., the object becomes larger or smaller in appearance). In order to track such an object, the computing device 302 may identify a set of visually distinctive features present on the object. These features may be interest points (e.g., corners) or the features may be larger blob-like features (e.g., extremal regions). In at least some embodiments, the distinctive features can be extracted by using a corner detector, such as a Harris corner detector, a Difference-of-Gaussians (DoG) corner detector, a Speeded-Up Robust Features (SURF) corner detector, or a Features from Accelerated Segment Test (FAST) corner detector. Alternatively, the distinctive features can be extracted using a Maximally Stable Extremal Regions (MSER) blob detector. The various feature detectors listed above are well known in the art and are provided purely as examples. It will be evident to one of ordinary skill in the art that any number of alternative feature detection techniques may be utilized within the scope of the various embodiments.

In various embodiments, as the object 303 moves away from the camera or towards the camera, the feature points also move closer or further away. If the computing device computes a bounding box 310 around these feature points (as shown in the illustration), the bounding box 310 also becomes smaller or larger as the object 303 moves away from or towards the camera.

Continuing with the illustration, the computing device 302 may capture at least two images of the object at two different distances from the camera, such as distance "Zf" 304 and distance "Zc" 305, as they will be referred to in the equations that follow. The scale change of the object (e.g., ratio of the bounding box 310 sides) from distance "Zf" 304 to distance "Zc" will be referred to as "s". In various embodiments, the scale change "s" can be measured using any reliable object tracking algorithm, such as the Median Flow tracker.

If two points (X1,Y1,Zc) and (X2,Y2,Zc) were to be plotted on the object's surface such that they would be located at the same distance "Z" from the camera, the image co-ordinates of these points would be represented by the relationships "x1=fX1/Zc" and "x2=fX2/Zc" where "f" represents the focal length of the camera. The distance between them can be calculated according to the Equation 1 shown below.

$$d1=x1-x2=f(X1-X2)/Zc \qquad \text{Equation 1}$$

If the object were to be located at a different distance from the camera, such as distance "Zf", the distance between the two points could be represented by Equation 2 shown below.

$$d2=f(X1-X2)/Zf \qquad \text{Equation 2}$$

Consequently, the scale change may be determined by the relationship $d1/d2=Zf/Zc$, meaning that the scale change "s" can be represented by Equation 3 shown below:

$$s=Zf/Zc \qquad \text{Equation 3}$$

In addition, the computing device can calculate stereo disparity of the object between at least a pair of images captured using the front-facing cameras, which will be described in further detail below with reference to FIGS. 5-8. If the two or more front-facing cameras are assumed to be perfectly aligned, and if the stereo disparity to the human face is computed when the computing device is at distance "Zf" and "Zc" from the object (i.e., which implies that the computing device is at distance "D-Zf" and "D-Zc" from the user's face respectively), then the stereo disparity of the user's face when the computing device is at a distance "Zf" from the object can be calculated by using Equation 4 shown below. (In Equation 4, "B" represents the spacing between the front-facing cameras and "f" represents the focal length).

$$\text{Disparity}(Zf)=fB/(D-Zf) \qquad \text{Equation 4}$$

Similarly, the stereo disparity of the human face when the mobile device is at a distance "Zc" from object can be calculated according to the Equation 5 shown below.

$$\text{Disparity}(Zc)=fB/(D-Zc) \qquad \text{Equation 5}$$

Equations 3, 4 and 5 illustrated above are linearly independent and can be solved simultaneously for D, Zf and Zc. Furthermore, since the object distances are known, the dimensions of the object can also be determined as shown in Equations 1 and 2 also illustrated above.

Figure 4:
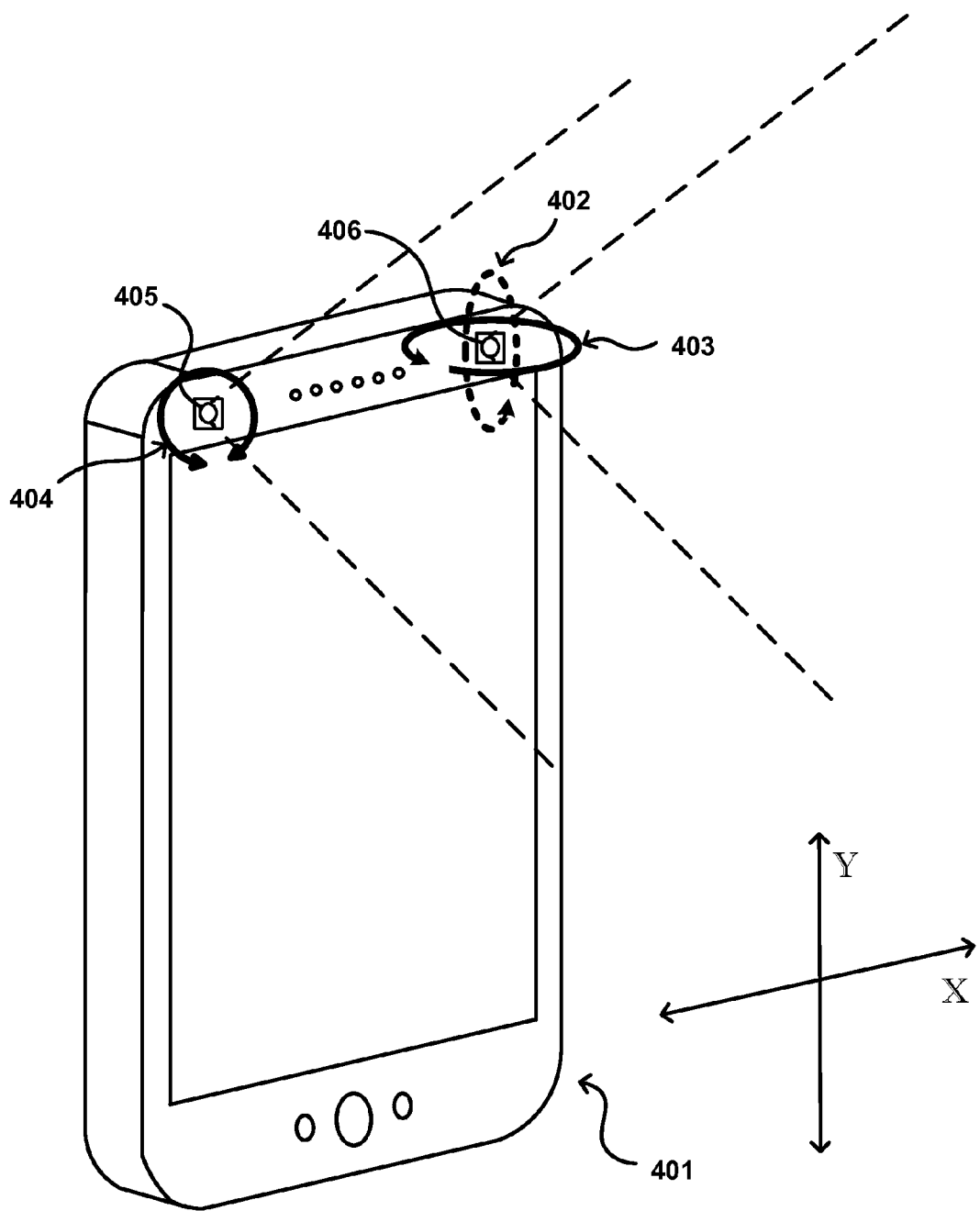
FIG. 4 illustrates an example of some camera misalignments that may occur around the yaw axis, the pitch axis and/or the roll axis, in accordance with various embodiments.

In general, stereo-disparity can be reliably computed only when the two camera optical axes are aligned. However, under real world conditions, the front-facing cameras may become misaligned due to a variety of different reasons. For example, the computing device may be dropped, exposed to extreme changes in thermal conditions, or may include manufacturing defects. Any of these factors may cause the front-facing cameras of the computing device to become relatively misaligned around the yaw axis, the pitch axis or the roll axis. FIG. 4 illustrates an example of some camera misalignments that may occur around the yaw axis, the pitch axis and/or the roll axis, in accordance with various embodiments. As shown in the illustration, the computing device 401 includes two front-facing cameras 405 and 406 that may be configured for stereo image processing. The two front-facing cameras may initially be exactly aligned, however, over time the two cameras 405 and 406 may become misaligned due to the various reasons described above. As shown in the illustration, the misalignments between the two cameras may occur around the roll axis 405, the pitch axis 402 or the yaw axis 403 relative with respect to each other.

In an embedded setting, misalignments around the roll axis 405 are relatively small and can usually be ignored. Pitch errors (for the typically small misalignments around the pitch axis 402) can be modeled as a uniform relative shift in the vertical (Y) direction. Pitch errors can therefore be detected and compensated for by computing and matching interest points in each stereo camera image. For example, under perfect alignment, the vertical (Y) coordinates of the matching interest points would be identical. Because of this, the average/median Y misalignment can be attributed to pitch errors and therefore can be calculated (i.e., can be compensated for). On the other hand, it is generally not possible to compensate for yaw errors (misalignments around the yaw axis 403) using interest point matching for general images. This is because the X coordinates of matching interest points do not have to be identical due to the spacing between the two front-facing cameras 405 and 406. Yaw errors (for the typically small yaw misalignments observed) can thus be modeled as a uniform translation in the horizontal (X direction) and consequently affects the stereo disparity computed.

Therefore, the yaw error (i.e., misalignment of the cameras around the yaw axis) can be approximated as a uniform translation of a number of pixels in the X direction. This translation will be referred to as "tx" in the equations below and the translation can be represented by the relationship "tx~=f tan (residual-yaw))". If the computing device is able to capture at least three images at three different distances from the object (e.g., as the user is moving their hand closer to the object and away from the object), the computing device can compute the translation "tx" in the X direction that is attributed to a misalignment of the front-facing cameras around the yaw axis. Particularly, if the disparity of the user's face (or other feature) is measured when the computing device is at three different distances from the object (z1,z2,z3), then the disparity at each distance can be calculated according to Equations 6, 7 and 8 shown below.

$$\text{Disparity}(z1)=fB/(D-z1)+tx \qquad \text{Equation 6}$$

$$\text{Disparity}(z2)=fB/(D-z2)+tx \qquad \text{Equation 7}$$

$$\text{Disparity}(z3)=fB/(D-z3)+tx \qquad \text{Equation 8}$$

In addition, because the computing device is also tracking the scale changes of the object between the three images (i.e., first image, second image, third image), the scale changes can be represented using Equations 9 and 10 shown below.

$$z1/z2=k12 \qquad \text{Equation 9}$$

$$z1/z3=k13 \qquad \text{Equation 10}$$

Consequently, Equations 6, 7, 8, 9, 10, are five equations with five variables D, z1, z2, z3 and tx, and can therefore be solved. In this way, the object size, the depth and the residual yaw errors (i.e., pixel offset in the X direction attributed to the misalignment of the cameras around the yaw axis) can be estimated simultaneously.

As previously described, the object depth information and the camera misalignment errors may be computed if the computing device is equipped with at least two front-facing cameras that have been configured for stereo image processing, such that the computing device is able to determine the distance between the user and the device based on the stereo disparity between pairs of images captured by the two front-facing cameras. FIGS. 5-8 illustrate some examples of front-facing cameras configured for stereo imaging and determining distances between the user and the device.

Figure 5:
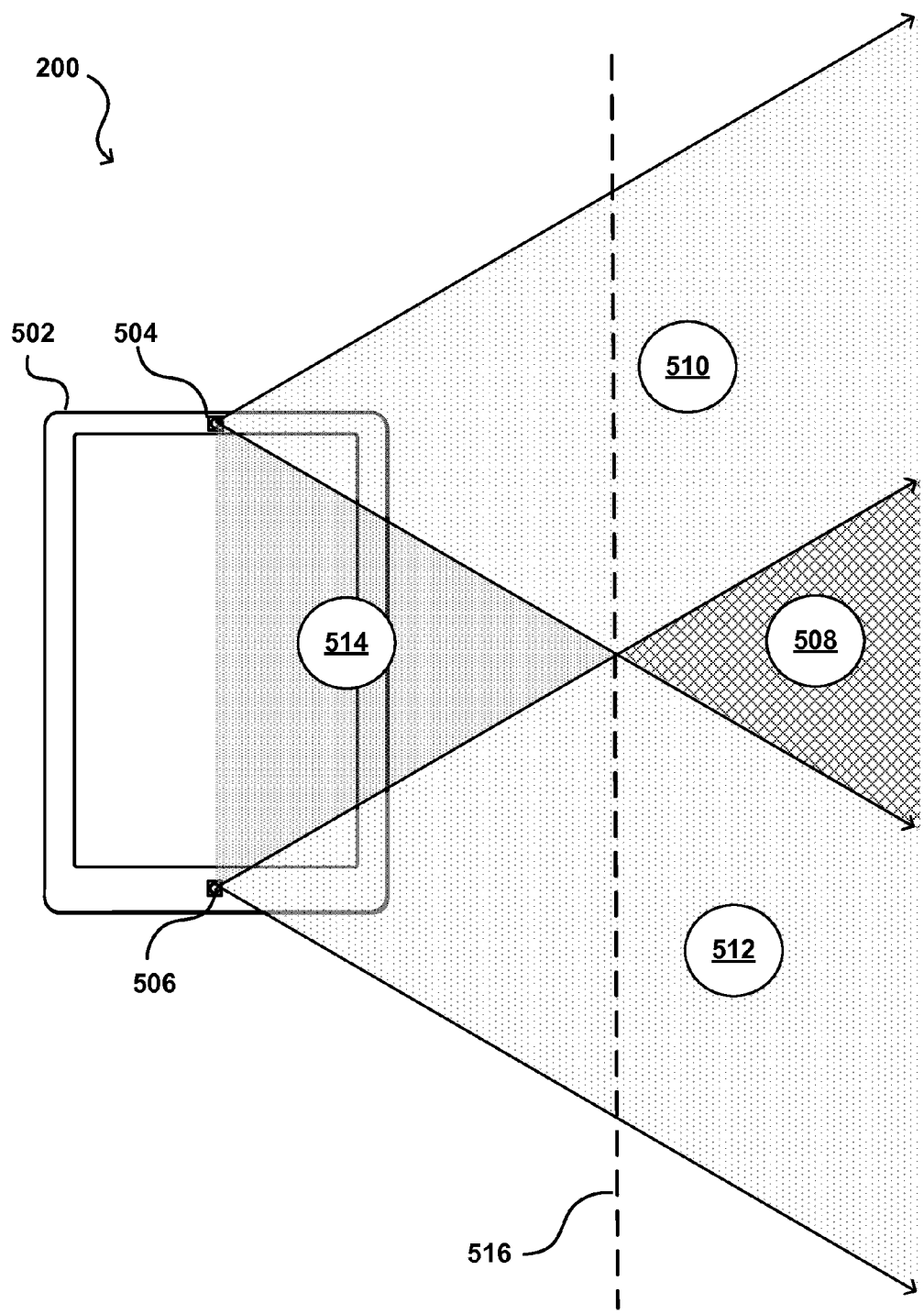
FIG. 5 illustrates an example situation where a pair of front-facing cameras of a computing device is capturing image information over respective fields of views, in accordance with various embodiments.

For example, FIG. 5 illustrates an example situation 500 where a pair of front-facing cameras 504, 506 of a computing device 502 is capturing image information over respective fields of views. It should be understood that the fields of view are presented for simplicity of explanation, and that cameras of actual devices can have larger fields of view and smaller dead zones. Further, the cameras on a device might be significantly closer to each other, which can also reduce the size of the dead zones.

In this example, it can be seen that both camera fields of view overlap at a zone 508 or region that is a distance from the device 502. Any object (e.g., user's face or other feature) that is located within the overlap zone 508 would be seen by both cameras 504, 506 and therefore can have disparity information determined for the object. Using conventional stereo imaging approaches, anything closer to the device than this overlap zone 508 may not be able to have disparity information determined, as the object would be seen by at most one of the cameras. In other words, an object in a zone 514 close to the device and between the cameras 504, 506 may not be seen by either camera and thus may not be included in the disparity information. However, in various embodiments, because the user's face is large enough and is usually located at a sufficient distance away from the computing device, it would be infrequent for none of the user's features to be present within the overlap zone 508. Even in such cases, the disparity information for zone 514 may be estimated based on previous measurements and/or motion tracking, for example. There may also be two zones 510, 512 where an object can only be seen by one of the cameras 504, 506. Again, while disparity information cannot be calculated for items that are located solely in either of these zones, it would be highly unusual for none of the user's features to be present in the overlap zone 508. As discussed, the effect of these zones 510, 512 decreases with distance, such that past a certain distance the fields of view of the cameras substantially overlap.

Figure 6A:
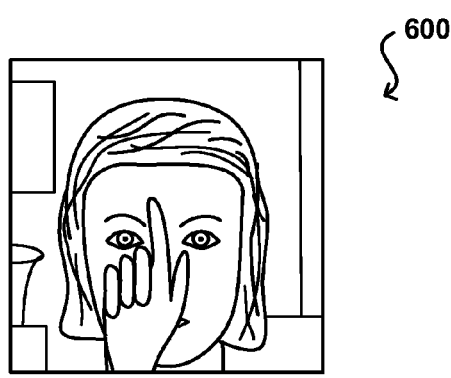
FIG. 6(a) illustrates an example of an image that could be captured using one of the front-facing stereo cameras embedded in a computing device.
Figure 6B:
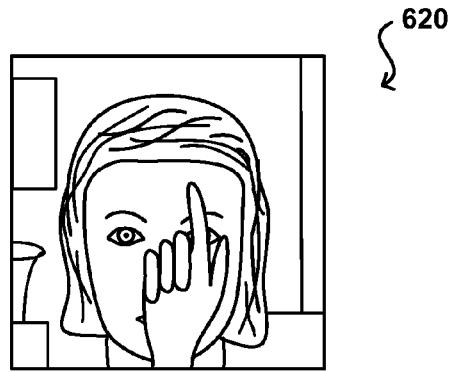
FIG. 6(b) illustrates an example of another image that could be captured using one of the front-facing stereo cameras embedded in a computing device.
Figure 6C:
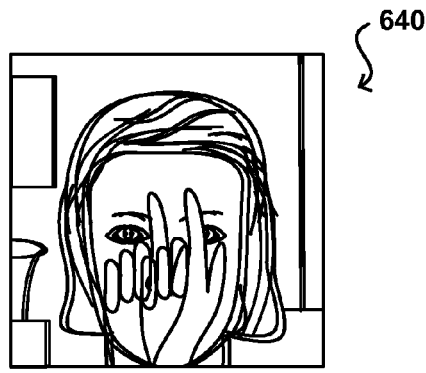
FIG. 6(c) illustrates an example combination image showing the relative position of various objects in the captured images.

Systems and methods in accordance with various embodiments can take advantage of the relationship between disparity and distance to determine the distance between the user and the computing device. For example, FIGS. 6(*a*) and 6(*b*) illustrate images 600, 620 that could be captured using a pair of front-facing stereo cameras embedded in a computing device. In various embodiments, the pair of front-facing cameras may capture the images simultaneously or substantially simultaneously and therefore would include matching points of interest in their respective images. For example, the user's finger, nose, eyes, eyebrows, lips or other feature points may be identified by the computing device in both images by using any one of the feature detection algorithms mentioned above. FIG. 6(*c*) illustrates an example combination image 640 showing the relative position of various objects in the captured images 600, 620. As illustrated, objects closest to the camera, such as the user's hand, have the greatest amount of disparity, or horizontal offset between images. Objects farther away from the device, such as a painting on the wall, have very small amounts of disparity. Objects between these two areas will have intermediate amounts of disparity based upon the relative distance of those objects from the cameras. It should be understood that words such as "horizontal" are used for purposes of simplicity of explanation and should not be interpreted to require a specific orientation unless otherwise stated, as devices can be used in any orientation and cameras or sensors can be placed at various locations on a device as appropriate.

Figure 7:
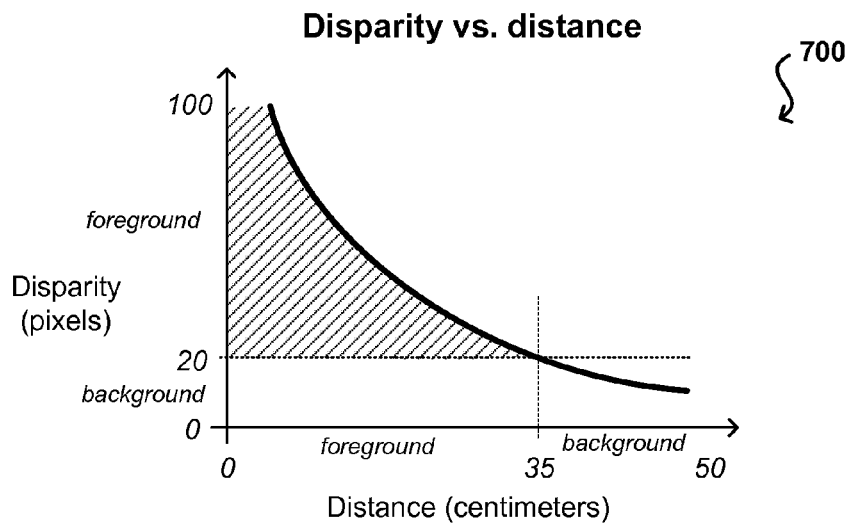
FIG. 7 illustrates an example plot showing a relationship of disparity with distance, in accordance with various embodiments.

FIG. 7 illustrates an example plot 700 showing a relationship of disparity with distance. As illustrated, the amount of disparity is inversely proportional to the distance from the cameras, such that there can be significantly more levels of disparity in the near camera field (e.g., 0-1 m) than in the far field (e.g., 1 m-infinity). Further, the decrease is not linear but decreases more quickly near the device than at a distance, as objects in the distance can have little to no disparity regardless of whether they are twenty feet away or a mile away. An approach in accordance with various embodiments can determine the distance between a user's feature and the camera based on the amount of stereo disparity between the two images captured by the pair of front-facing cameras. For example, a user's face looking at a smart phone might typically be located within 50 centimeters from the device. By examining the disparity relationship curve 700 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, etc.) in the stereo images, and estimate the distance between those feature points and the computing device. For example, the amount of disparity, D, at a given distance, d, can be represented by the relationship:

$$D = f \times B / d$$

where f is the focal length of each of the matched cameras and B is the baseline, or distance between the viewpoints of the cameras based at least in part upon their relative positions and separation. In this example, if the focal length of a VGA camera is four hundred pixels and the baseline is five centimeters, for a distance of one meter the disparity would be twenty pixels. Based on relationships such as this one, the computing device may be able to determine the distance between the user's feature points and the camera.

In various embodiments, the pair of front-facing cameras may also be used to determine the location of one or more features of an object, such as the user's finger with respect to a display or other such element of a computing device. FIGS. 8(*a*), 8(*b*), 8(*c*) and 8(*d*) illustrate an example approach to determining a relative distance and/or location of at least one feature of a user that can be utilized in accordance with various embodiments. In this example, input can be provided to a computing device 802 by monitoring the position of the user's fingertip 804 with respect to the device, although various other features can be used as well as discussed and suggested elsewhere herein. In some embodiments, a pair of front-facing cameras can be used to capture image information including the user's fingertip, where the relative location can be determined in two dimensions from the position of the fingertip in the image and the distance determined by the relative size of the fingertip in the image. The distance between the finger and the camera may be computed based on the stereo disparity information, as previously described. The illustrated computing device 802 in this example instead includes at least two different image capture elements 806, 808 positioned on the device with a sufficient separation such that the device can utilize stereoscopic imaging (or another such approach) to determine a relative position of one or more features with respect to the device in three dimensions. Although two cameras are illustrated near a top and bottom of the device in this example, it should be understood that there can be additional or alternative imaging elements of the same or a different type at various other locations on the device within the scope of the various embodiments. Further, it should be understood that terms such as "top" and "upper" are used for clarity of explanation and are not intended to require specific orientations unless otherwise stated. In this example, the upper camera 806 is able to see the fingertip 804 of the user as long as that feature is within a field of view 810 of the upper camera 806 and there are no obstructions between the upper camera and those features. If software executing on the computing device (or otherwise in communication with the computing device) is able to determine information such as the angular field of view of the camera, the zoom level at which the information is currently being captured, and any other such relevant information, the software can determine an approximate direction 814 of the fingertip with respect to the upper camera. In some embodiments, methods such as ultrasonic detection, feature size analysis, luminance analysis through active illumination, or other such distance measurement approaches can be used to assist with position determination as well.

Figure 8A:
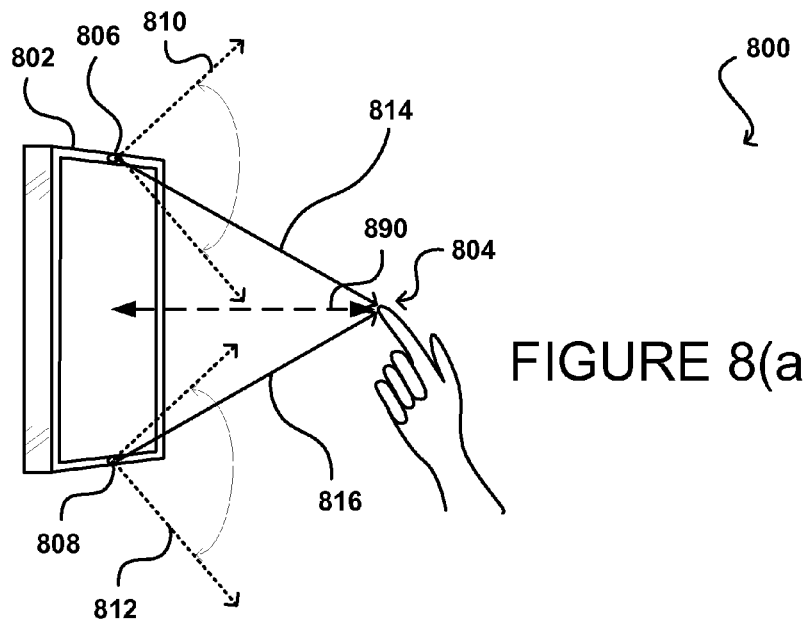
FIGS. 8(a), 8(b), 8(c) and 8(d) illustrate an example approach to determining a relative distance and/or location of at least one feature of a user that can be utilized in accordance with various embodiments.

In this example, a second camera is used to assist with location determination as well as to enable distance determinations through stereoscopic imaging. The lower camera 808 in FIG. 8(a) is also able to image the fingertip 804 as long as the feature is at least partially within the field of view 812 of the lower camera 808. Using a similar process to that described above, appropriate software can analyze the image information captured by the lower camera to determine an approximate direction 816 to the user's fingertip. The direction can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a forty-five degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

Figures 8B, 8C:
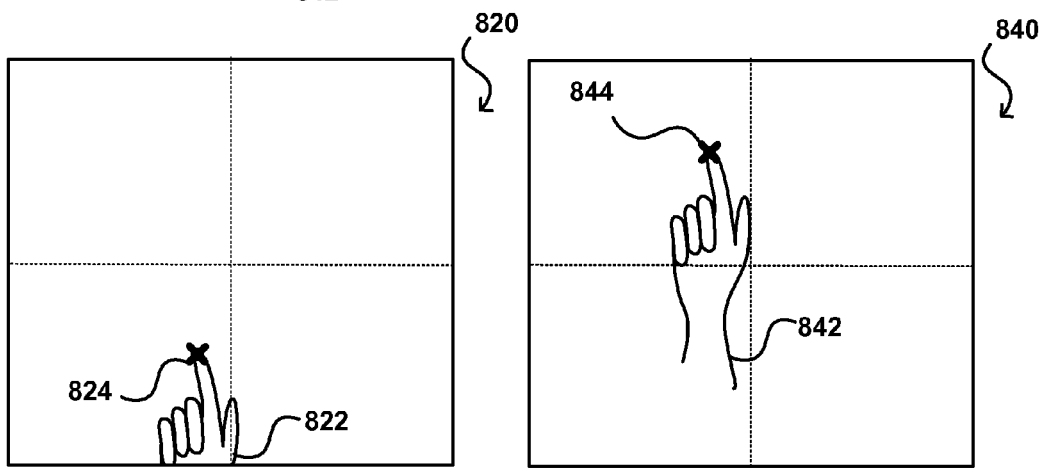

Further illustrating such an example approach, FIGS. 8(b) and 8(c) illustrate example images 820, 840 that could be captured of the fingertip using the cameras 806, 808 of FIG. 8(a). In this example, FIG. 8(b) illustrates an example image 820 that could be captured using the upper camera 806 in FIG. 8(a). One or more image analysis algorithms can be used to analyze the image to perform pattern recognition, shape recognition, or another such process to identify a feature of interest, such as the user's fingertip, thumb, hand, or other such feature. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon identifying the feature, here the user's hand 822, at least one point of interest 824, here the tip of the user's index finger, is determined. As discussed above, the software can use the location of this point with information about the camera to determine a relative direction to the fingertip. A similar approach can be used with the image 840 captured by the lower camera 808 as illustrated in FIG. 8(c), where the hand 842 is located and a direction to the corresponding point 844 determined. As illustrated in FIGS. 8(b) and 8(c), there can be offsets in the relative positions of the features due at least in part to the separation of the cameras. Further, there can be offsets due to the physical locations in three dimensions of the features of interest. By looking for the intersection of the direction vectors to determine the position of the fingertip in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

As can be seen in FIG. 8(a), however, there can be a region near the surface of the screen that falls outside the fields of view of the cameras on the device, which creates a "dead zone" where the location of a fingertip or other feature cannot be determined (at least accurately or quickly) using images captured by the cameras of the device.

Figure 8D:
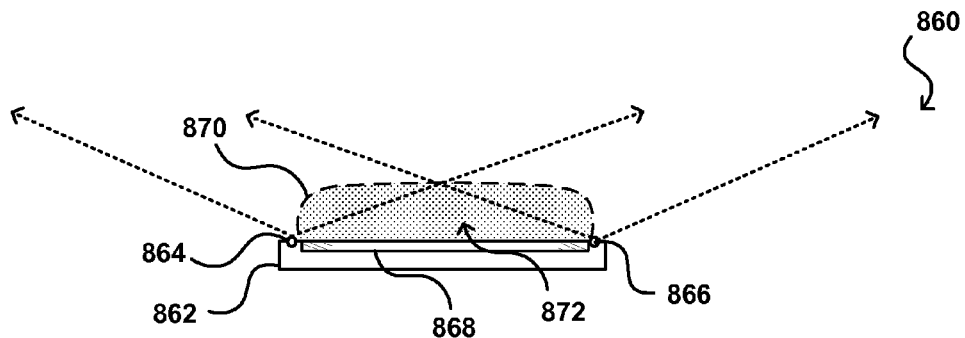

FIG. 8(d) illustrates an example configuration 860 wherein the device 862 includes a pair of front-facing cameras 864, 866 each capable of capturing images over a respective field of view. If a fingertip or other feature near a display screen 868 of the device falls within at least one of these fields of view, the device can analyze images or video captured by these cameras to determine the location of the fingertip. In order to account for position in the dead zone outside the fields of view near the display, the device can utilize a second detection approach, such as by using a capacitive touch detection component as known or used in the art with various touch screens. A capacitive touch detection component can detect position at or near the surface of the display screen. By adjusting the parameters of the capacitive touch detection component, the device can have a detection range 870 that covers the dead zone and also at least partially overlaps the fields of view. Such an approach enables the location of a fingertip or feature to be detected when that fingertip is within a given distance of the display screen, whether or not the fingertip can be seen by one of the cameras. Other location detection approaches can be used as well, such as ultrasonic detection, distance detection, optical analysis, and the like.

Figure 9:
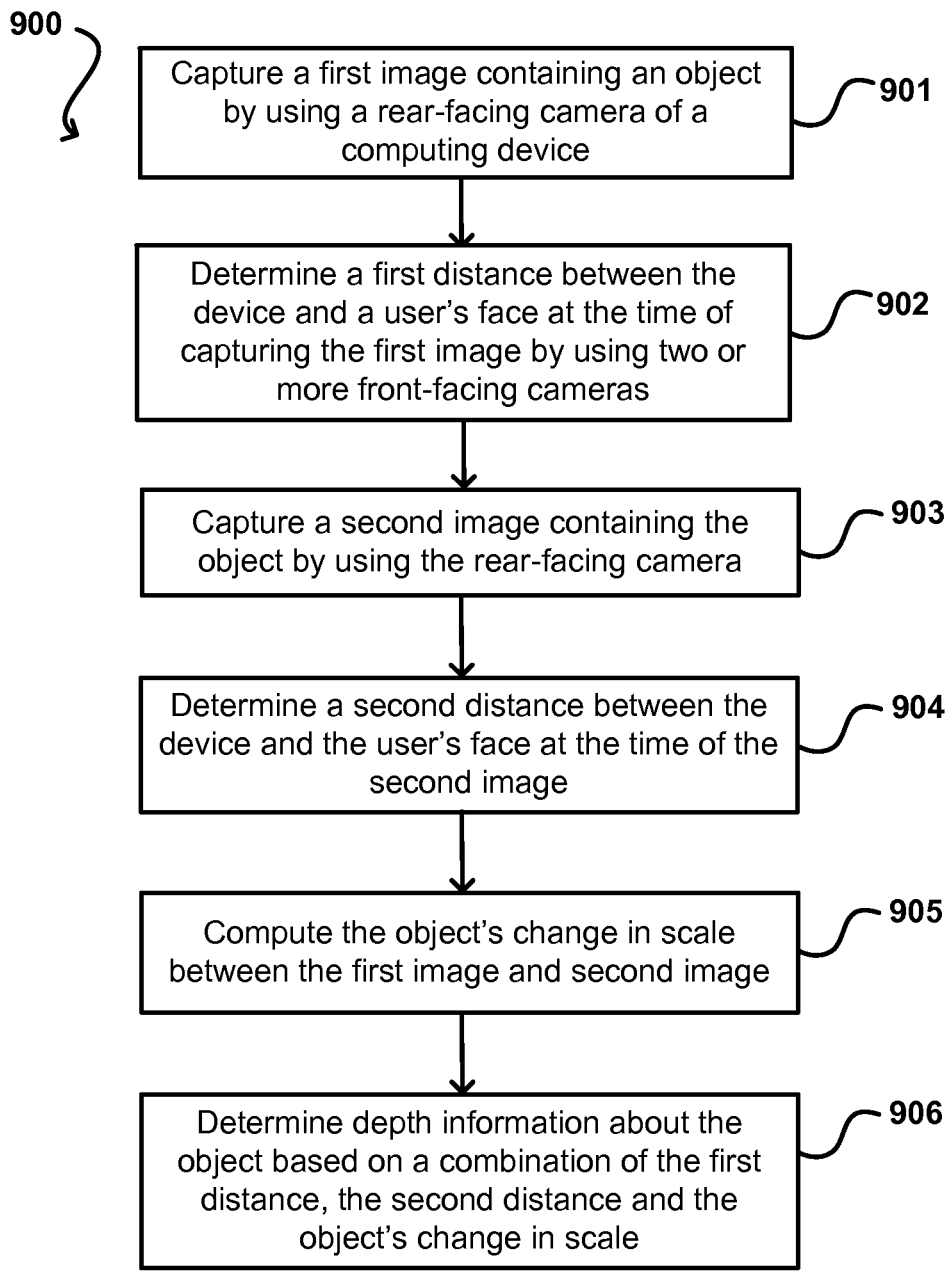
FIG. 9 illustrates an example of a process of determining object depth information based on image data captured by the front-facing cameras in combination with the rear-facing camera, in accordance with various embodiments.

FIG. 9 illustrates an example of a process 900 of determining object depth information based on image data captured by the front-facing cameras in combination with the rear-facing camera, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 901, the computing device captures a first image using the rear-facing camera. The first image contains an object being tracked by the computing device. The object may be tracked by detecting one or more distinctive features of the object using a feature detector. In operation 902, the computing device determines a first distance between the computing device and one or more feature points on a user's face. The first distance can be determined based on image data captured by the two or more front-facing cameras of the computing device. For example, the first distance may be determined based on the stereo disparity of the feature points between a pair of images captured by the front-facing cameras.

In operation 903, the computing device captures a second image using the rear-facing camera. The second image also contains the object being tracked by the computing device. In operation 904, the computing device determines a second distance between the computing device and the one or more feature points on the user's face at the time of capturing the second image. The second distance can also be determined based on image data captured by the two or more front-facing cameras (e.g., based on the stereo disparity between images captured by a pair of front-facing cameras).

In operation 905, the computing device computes a scale change of the object (or other difference in object size) between the first image and the second image. For example, the computing device may draw a bounding box around the object in the first image and in the second image and compare the sizes (e.g., length, width) of the bounding box between the two images to determine the scale change. In operation 906, the computing device determines the depth information associated with the object based at least in part on the first distance, the second distance and the scale change of the object. The depth information may include such information as the distance between the object and the user, the distance between the object and the computing device, the dimensions of the object and the like.

Figure 10:
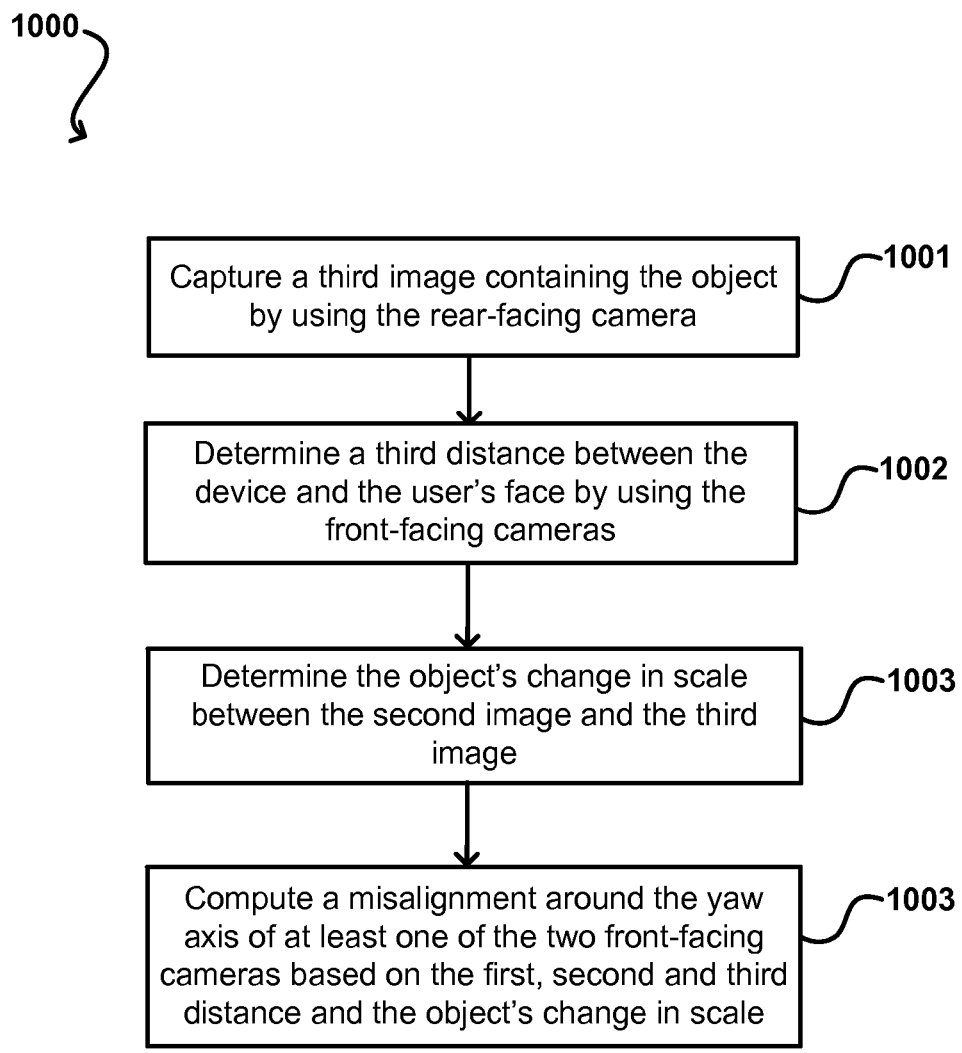
FIG. 10 illustrates an example process of determining a misalignment of at least one of the two or more front-facing cameras, in accordance with various embodiments.

FIG. 10 illustrates an example process 1000 of determining a misalignment of at least one of the two or more front-facing cameras, in accordance with various embodiments. As illustrated in operation 1001, the computing device captures a third image by using the rear-facing camera. The third image also contains the object being tracked by the computing device. In operation 1002, the computing device determines a third distance between the device and one or more feature points on the user's face. As previously mentioned, the third distance is also computed based on the stereo disparity captured by using the front-facing cameras. In operation 1003, the computing device determines the object's change in scale between the second image and the third image. Similarly, the computing device may determine the scale changes between the first and the second image. In operation 1004, the computing device determines the amount of misalignment between the two or more front-facing cameras. For example, the computing device may compute the offset in the X direction in pixels that is caused by the misalignment of the front-facing cameras around the yaw axis.

Figure 11:
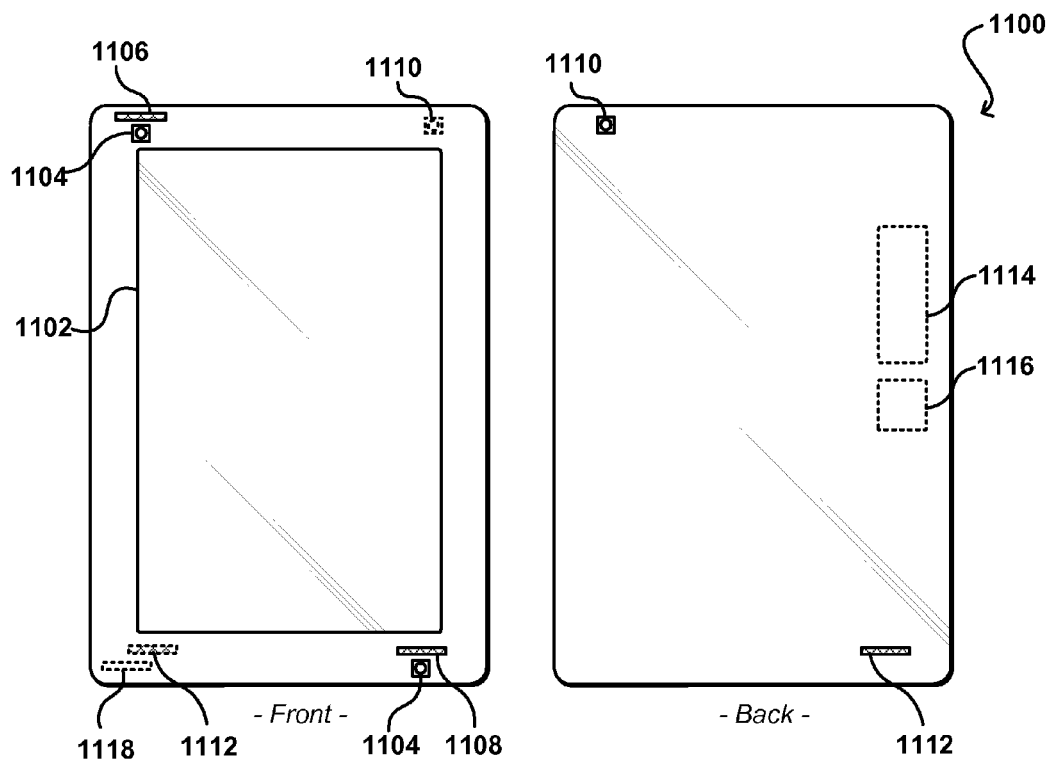
FIG. 11 illustrates front and back views of an example portable computing device that can be used in accordance with various embodiments.

FIG. 11 illustrates front and back views of an example client computing device 1100 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others. The client device may have an associated browser width, browser height, as well as various other client-side information associated therewith.

In this example, the portable computing device 1100 has a display screen 1102 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 1110 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 1104 on the "front" of the device and one image capture element 1110 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 1106 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 1100 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 1114, such as may include at least one wired or wireless component operable to communicate with one or more portable computing devices. The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

Figure 12:
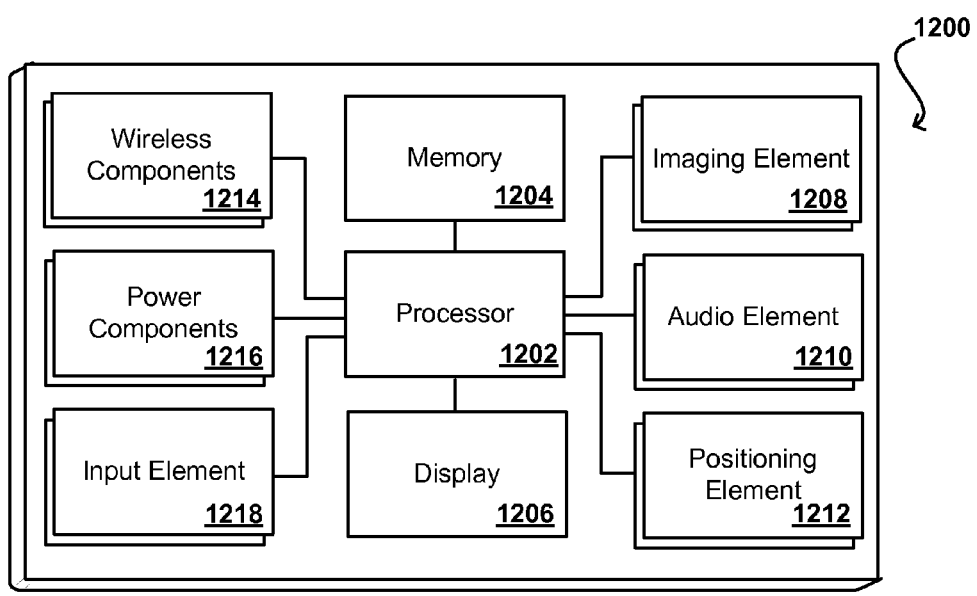
FIG. 12 illustrates an example set of basic components of a portable computing device, such as the device described with respect to FIG. 11.

In order to provide functionality such as that described with respect to FIG. 11, FIG. 12 illustrates an example set of basic components of a portable computing device 1200, such as the device 1100 described with respect to FIG. 11. In this example, the device includes at least one processor 1202 for executing instructions that can be stored in at least one memory device or element 1204. As would be apparent to one of ordinary skill in the art, the device can include many types of memory, data storage or computer-readable storage media, such as a first data storage for program instructions for execution by the processor 1202, the same or separate storage can be used for images or data, a removable storage memory can be available for sharing information with other devices, etc.

The device typically will include some type of display element 1206, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1208, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device.

The device, in many embodiments, will include at least one audio element 1210, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 1212 that provides information such as a position, direction, motion, or orientation of the device. This positioning element 1212 can include, for example, accelerometers, inertial sensors, electronic gyroscopes, electronic compasses, and GPS elements.

The device can include at least one additional input device 1218 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 1214 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 1216 known in the art for providing power to a portable computing device, which can include capacitive charging elements for use with a power pad or similar device as discussed elsewhere herein. The example device also can include at least one touch and/or pressure sensitive element 1218, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

Figure 13:
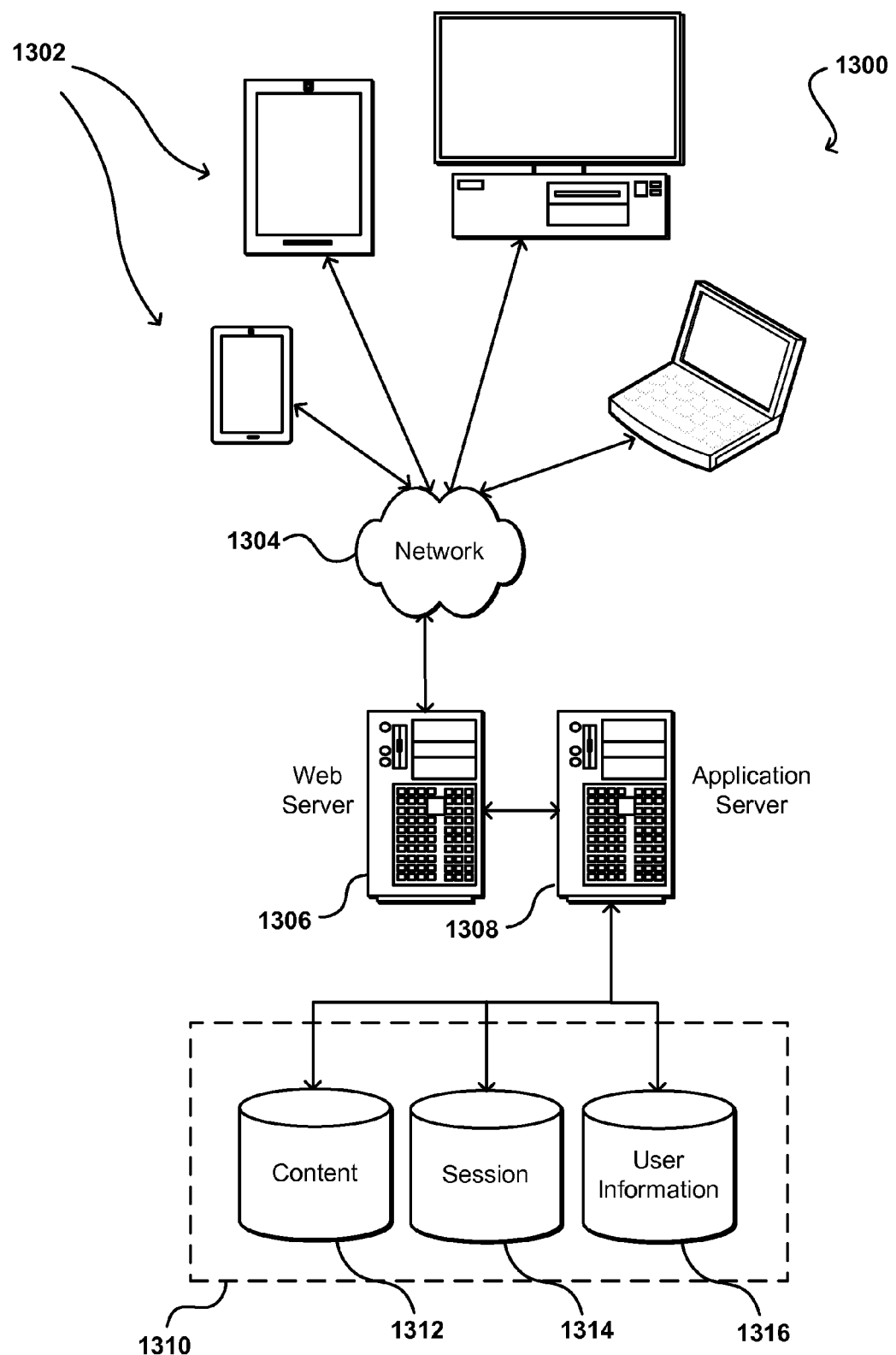
FIG. 13 illustrates an example of an environment for implementing aspects in accordance with various embodiments.

As discussed, different approaches can be implemented in various environments in accordance with the described embodiments. For example, FIG. 13 illustrates an example of an environment 1300 for implementing aspects in accordance with various embodiments. As will be appreciated, although a Web-based environment is used for purposes of explanation, different environments may be used, as appropriate, to implement various embodiments. The system includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1306 for receiving requests and serving content in response thereto, although for other networks, an alternative device serving a similar purpose could be used, as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1306 in the form of HTML, XML or another appropriate structured language in this example. The handling of all requests and responses, as well as the delivery of content between the client device 1302 and the application server 1308, can be handled by the Web server 1306. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing content (e.g., production data) 1312 and user information 1316, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
 a rear-facing camera;
 two or more front-facing cameras;
 at least one processor; and memory including instructions that, when executed by the at least one processor, cause the computing device to:
capture a first image with the computing device positioned between an object and a user using the rear-facing camera, the first image containing a first representation of the object;
determine a first distance between the computing device and at least a portion of a user's face at a time of capturing the first image, the first distance determined based at least in part on image data captured by the two or more front-facing cameras;
capture a second image with the computing device positioned between the object and the user using the rear-facing camera, the second image containing a second representation of the object;
determine a second distance between the computing device and the at least a portion of the user's face at the time of capturing the second image, the second distance determined based at least in part on image data captured by the two or more front-facing cameras;
compute a scale change of the object between the first representation of the object in the first image and second representation of the object in the second image; and
determine depth information associated with the object based at least in part on the first distance, the second distance and the scale change of the object.

2. The computing device of claim 1, wherein the second image is captured subsequent to physically moving the computing device after capturing the first image.

3. The computing device of claim 1, wherein the depth information includes at least one of:
a distance between the at least a portion of the user's face and the object,
a distance between the computing device and the object at the time of capturing the first image; or
a distance between the computing device and the object at the time of capturing the second image.

4. The computing device of claim 1, wherein the instructions, when executed by the at least one processor, further cause the computing device to:
capture a third image using the rear-facing camera, the third image containing the object;
determine a third distance between the computing device and the at least a portion of the user's face at a time of capturing the third image, the third distance determined based at least in part on image data captured by the two or more front-facing cameras; and
determine a misalignment around a yaw axis of at least one of the two or more front-facing cameras based at least in part on the first distance, the second distance and the third distance.

5. A computer implemented method, comprising:
under the control of one or more computer systems configured with executable instructions,
capturing a first image using a camera of a computing device with the computing device positioned between an object and a user, the first image containing a first representation of the object;
capturing a second image using the camera of the computing device with the computing device positioned between the object and the user, the second image containing a second representation of the object;
determining a change in a size attribute of the object between the first image and the second image;
determining distance information between at least a portion of the computing device and at least one feature point of the user based on images captured by two or more cameras of the computing device when the first image and the second image are captured; and
determining depth information associated with the object based at least in part on the distance information and the change in the size attribute of the object.

6. The computer implemented method of claim 5, wherein determining the distance information between the at least the portion of the computing device and the at least one feature point further comprises:
capturing a pair of stereo images of the at least one feature point by using the two or more cameras, wherein the two or more cameras are front-facing cameras of the computing device configured for stereo imaging; and
computing a stereo disparity of the at least one feature point between the pair of stereo images, the stereo disparity being indicative of the distance information.

7. The computer implemented method of claim 5, further comprising:
capturing a third image using the camera of the computing device, the third image containing a third representation of the object;
determining the distance information between the at least a portion of the computing device and the at least one feature point upon each of: a time of capturing the first image, a time of capturing the second image and a time of capturing the third image; and
determining an offset due to a misalignment of the two or more cameras around at least one of: a yaw axis, a pitch axis or a roll axis based at least in part on the distance information.

8. The computer implemented method of claim 5, wherein the depth information is further determined based at least in part on a focal length of the camera of the computing device.

9. The computer implemented method of claim 5, wherein the camera of the computing device is aimed in a substantially opposite direction with respect to the two or more cameras of the computing device.

10. The computer implemented method of claim 5, wherein the depth information includes at least one of:
a distance between the at least one feature point and the object;
a distance between at least the portion of the computing device and the at least the portion of the object at the time of capturing the first image;
a distance between at least the portion of the computing device and the at least the portion of the object at the time of capturing the first image; or
dimensions of the object.

11. The computer implemented method of claim 5, wherein determining a change in a size attribute of the object further comprises:
tracking one or more feature points associated with the object between the first image and the second image, wherein the camera of the computing device is physically moved between the time of capturing the first image and the time of capturing the second image; and
determining a change in the size attribute of the object based at least in part on the tracked feature points associated with the object.

12. The computer implemented method of claim 11, wherein the one or more feature points associated with the object further comprise at least one of:
one or more corner points extracted using a Harris corner detector, a Difference-of-Gaussians (DoG) corner detector, a Speeded-Up Robust Features (SURF) corner detectors, or a Features from Accelerated Segment Test (FAST) corner detector; or one or more blobs detected using a Maximally Stable Extremal Regions (MSER) blob detector.

13. A non-transitory computer readable storage medium storing instructions that, when executed by one or more processors, cause a computing system to:
   capture a first image using a camera of a computing device with the computing device positioned between an object and a user, the first image containing a first representation of the object;
   capture a second image using the camera of the computing device with the computing device positioned between the object and the user, the second image containing a second representation of the object;
   determine a change in a size attribute of the object between the first image and the second image;
   determine distance information between at least a portion of the computing device and at least one feature point of the user based on images captured by two or more cameras of the computing device when the first image and the second image are captured; and
   determine depth information associated with the object based at least in part on the distance information and the change in the size attribute of the object.

14. The non-transitory computer readable storage medium of claim 13, wherein the instructions to determine the distance information between the at least the portion of the computing device and the at least one feature point of the user, when executed by the one or more processors, further cause the computing system to:
   capture a pair of stereo images of the at least one feature point by using the two or more cameras, wherein the two or more cameras are front-facing cameras of the computing device configured for stereo imaging; and
   compute a stereo disparity of the at least one feature point between the pair of stereo images, the stereo disparity being indicative of the distance information.

15. The non-transitory computer readable storage medium of claim 13, wherein the instructions, when executed by the one or more processors, further cause the computing system to:
   capture a third image using the camera of the computing device, the third image containing a third representation of the object;
   determine the distance information between the at least a portion of the computing device and the at least one feature point upon each of: a time of capturing the first image, a time of capturing the second image and a time of capturing the third image; and
   determine an offset due to a misalignment of the two or more cameras around at least one of: a yaw axis, a pitch axis or a roll axis based at least in part on the distance information.

16. The non-transitory computer readable storage medium of claim 13, wherein the depth information is further determined based at least in part on a focal length of the camera of the computing device.

17. The non-transitory computer readable storage medium of claim 13, wherein the camera of the computing device is aimed in a substantially opposite direction with respect to the two or more cameras of the computing device.

18. The non-transitory computer readable storage medium of claim 13, wherein the depth information includes at least one of:
   a distance between the at least one feature point and the object;
   a distance between at least the portion of the computing device and the at least the portion of the object at the time of capturing the first image;
   a distance between at least the portion of the computing device and the at least the portion of the object at the time of capturing the first image; or
   dimensions of the object.

19. The non-transitory computer readable storage medium of claim 13, wherein the instructions, when executed by the one or more processors to determine a change in a size attribute of the object, further cause the computing system to:
   track one or more feature points of the object between the first image and the second image, wherein the camera of the computing device is physically moved between the time of capturing the first image and the time of capturing the second image; and
   determine a change in the size attribute of the object based at least in part on the tracked feature points.

20. The non-transitory computer readable storage medium of claim 19, wherein the one or more feature points further comprise at least one of:
   one or more corner points extracted using a Harris corner detector, a Difference-of-Gaussians (DoG) corner detector, a Speeded-Up Robust Features (SURF) corner detectors, or a Features from Accelerated Segment Test (FAST) corner detector; or
   one or more blobs detected using a Maximally Stable Extremal Regions (MSER) blob detector.

* * * * *